June 19, 1951 V. LANG, JR 2,557,507
ADJUSTABLE JOINT STRUCTURE FOR ELECTRIC LAMP SUPPORTS
Filed May 11, 1950 2 Sheets-Sheet 1
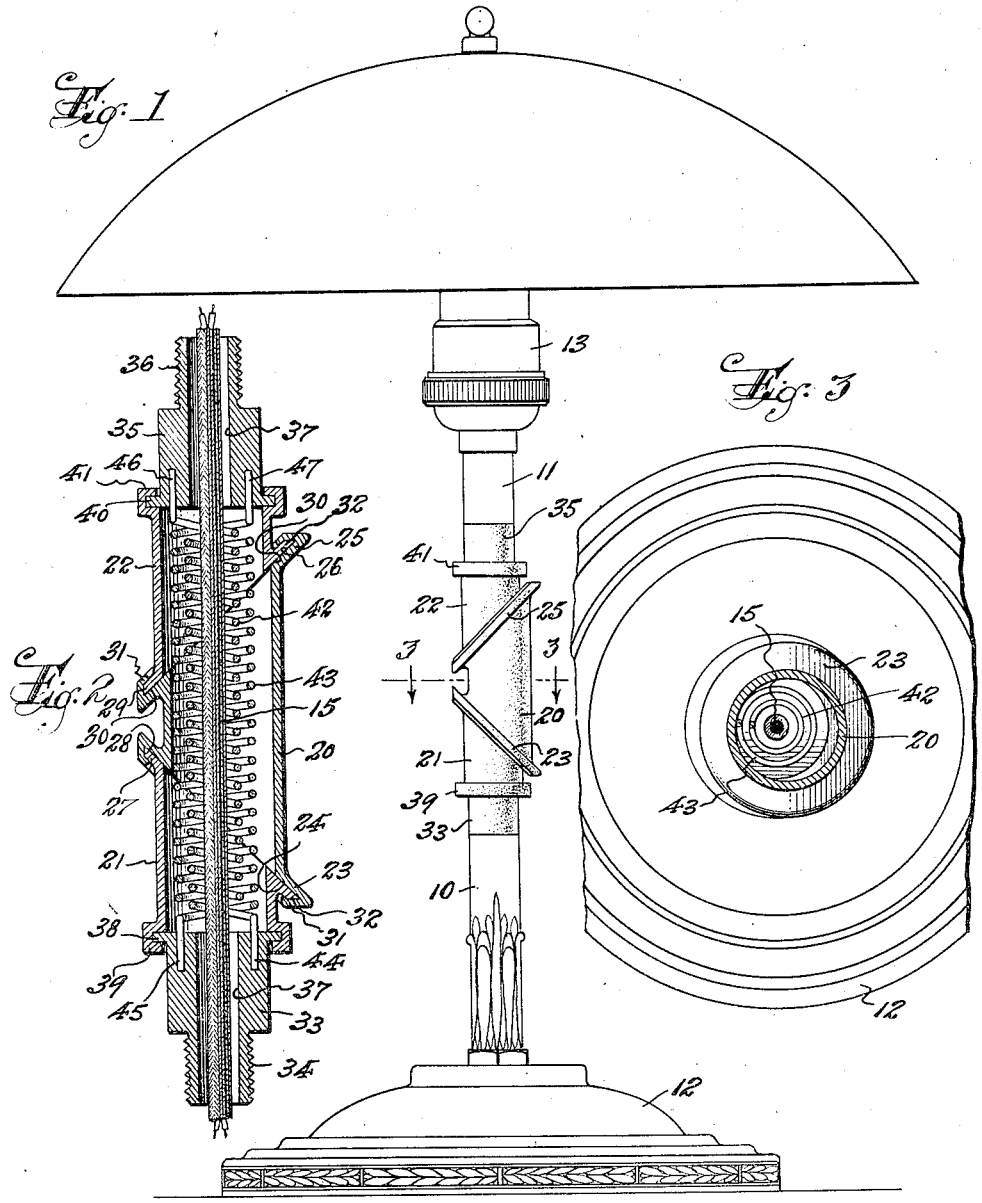
Inventor:
Victor Lang Jr.
BY George D. Richards
Attorney.

June 19, 1951  V. LANG, JR  2,557,507
ADJUSTABLE JOINT STRUCTURE FOR ELECTRIC LAMP SUPPORTS
Filed May 11, 1950  2 Sheets-Sheet 2
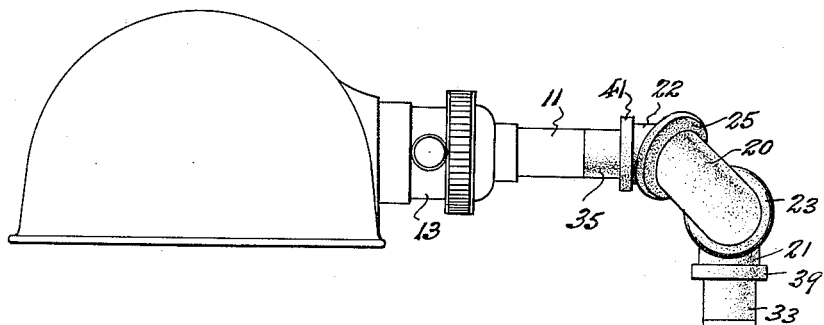
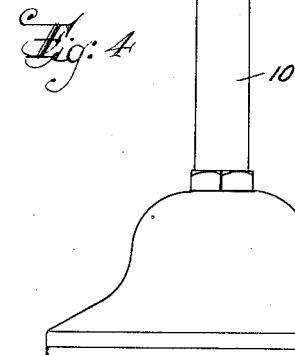
Fig. 4
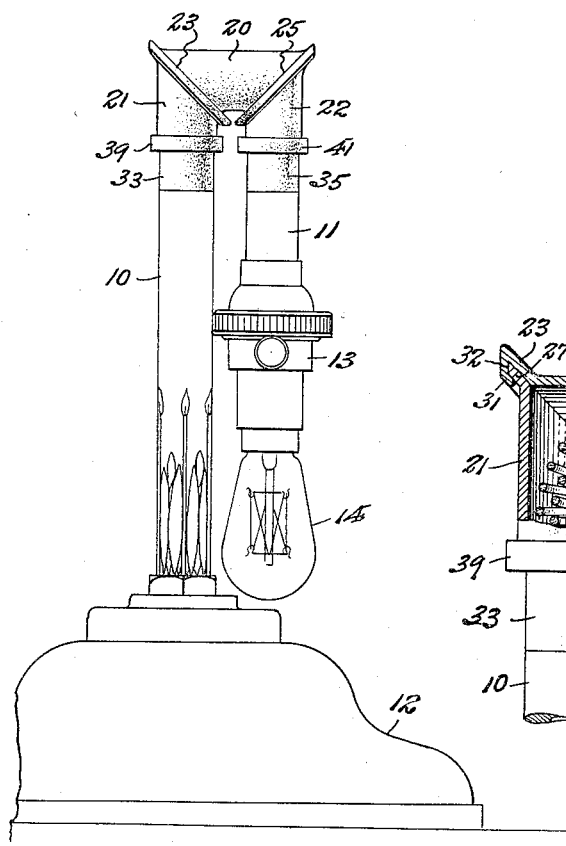
Fig. 5
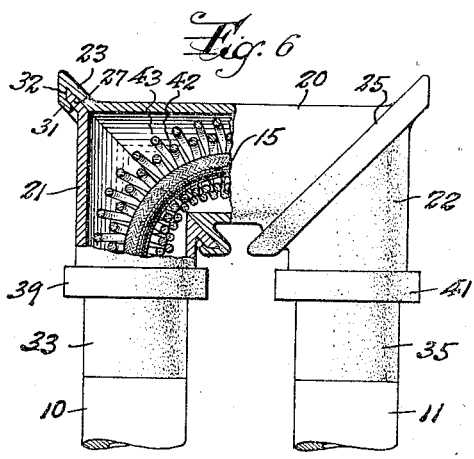
Fig. 6
Inventor:
Victor Lang Jr.
BY George D. Richards,
Attorney.

Patented June 19, 1951

2,557,507

UNITED STATES PATENT OFFICE 2,557,507

ADJUSTABLE JOINT STRUCTURE FOR ELECTRIC LAMP SUPPORTS

Victor Lang, Jr., Union, N. J.

Application May 11, 1950, Serial No. 161,425

8 Claims. (Cl. 287—14)

This invention relates to a novel adjustable joint structure for connection between wire conduit forming members of an electric lamp support.

The invention has for an object to provide an adjustable joint structure for the above stated purpose which comprises a plurality of relatively rotatable sections including internal means for supporting the electric lamp cord, cable or wires, which extend therethrough to the lamp, against injurious stresses or strains, abrasion, and kinking or like deformation, especially during adjusting manipulation of the joint structure.

The invention has for a further object to provide an adjustable joint structure comprising a plurality of endwise adjoined tubular sections, opposed ends of adjoining sections having mutually engaged bearing faces disposed in plane transversely angular to the axes of the sections, the cooperative angular bearing faces between one end of an intermediate section and the section adjoining thereto extending in opposite direction to the cooperative angular bearing faces between the opposite end of said intermediate section and the section adjoining the same, all whereby relative rotation of the sections effects bending of the joint structure as a whole; respective end sections of the joint structure being connected in swiveling relation to coupling elements which join the same to respective members of the lamp support, and helical spring means extending through the joint structure between and in affixed relation to said coupling elements; said spring serving to support the electric lamp cord, cable or wires which extend through the joint structure.

Other objects and advantages of the invention will become apparent as the following specification is read in connection with the accompanying drawings, in which:

Fig. 1 is a side elevational view of a lamp support equipped with the novel joint structure according to this invention, the joint structure being shown in condition wherein its sections are disposed in axial alignment; Fig. 2 is an enlarged longitudinal sectional view of the joint structure per se; and Fig. 3 is a transverse sectional view through the joint in the plane of the line 3—3 in Fig. 1.

Fig. 4 is a side elevational view of a lamp support equipped with the joint structure of this invention, the joint structure being shown in a 90° adjusted position; Fig. 5 is another view of a lamp support having the joint structure, the latter being shown in a 180° adjusted position; and Fig. 6 is an enlarged elevation in part section of the joint structure disposed in a 180° adjusted position.

Similar characters of reference are employed in the above described views, to indicate corresponding parts.

Referring to the drawings, the novel joint structure of this invention is shown as operatively connected between tubular members of an electric lamp support, such, for example, as the lamp standard 10 and the lamp socket carrying arm or bracket 11. The lamp support usually includes a base 12 by which the standard 10 is supported, and the carrying arm or bracket 11 terminates in a socket 13 for the reception of an incandescent lamp bulb 14. Current is supplied to the socket 13 and lamp bulb connected thereto by conductive means such as a wire cord or cable 15 which extends upwardly through the standard 10, joint structure, and carrying arm or bracket 11 for connection with the lamp socket terminals in manner well known to the art.

The joint structure according to my invention comprises a plurality of endwise abutting, relatively movable tubular sections including at least one intermediate section 20 and opposite end sections which, for purposes of descriptive distinction, are hereinafter referred to as the lower end section 21 and the upper end section 22.

The lower end of the intermediate section 20 is provided with an oblique external annular flange 23 which intersects the longitudinal axis of this section in a transverse plane angular thereto and so as to extend in downward inclination from left to right, in the position of the joint structure as shown in Fig. 2. The external face of the flange 23 provides a correspondingly angular or oblique bearing face 24. The upper end of the intermediate section 20 is also provided with an oblique external annular flange 25 which intersects the longitudinal axis of this section in a transverse plane angular thereto but disposed to extend in upward inclination from left to right, in the position of the joint structure shown in Fig. 2, that is in an opposite direction of inclination. The external face of the flange 25 also provides a correspondingly angular or oblique bearing face 26. Preferably the oblique planes of the described end flanges and bearing faces of the intermediate section 20 are disposed at angles of 45° to the longitudinal axis of the intermediate section 20.

The lower end section 21 of the joint structure is provided at its upper end with an oblique external flange 27 and exterior bearing face 28 of angular degree and direction of inclination which corresponds to that of the flange 23 and bearing face 24 at the lower end of said intermediate section 20, and so as to mate therewith when opposed thereto by end to end abutment of said lower end section with said intermediate section. Similarly, the upper end section 22 of the joint structure is provided at its lower end with an oblique external flange 29 and exterior bearing face 30 of angular degree and direction of inclination which corresponds to that of the flange 25 and bearing face 26 at the upper end of said intermediate section 20, and so as to mate therewith when opposed thereto by end to end abutment of said upper section with said intermediate section.

Suitable means are provided for joining the end sections 21 and 22 with the intermediate section 20 so that said sections are subject to relative rotational movement. An illustrative form of means for this purpose comprises the provision, on one of each pair of meeting flanges which the abutting ends of the section include, of an annular peripheral coupling bead which is adapted to engage around the marginal peripheral portion of the opposed flange in swiveling relation thereto. As shown by way of example, the flanges 23 and 25 of the intermediate section 20 are respectively provided with such coupling beads 31 to respectively embrace the marginal peripheries 32 of the flanges 27 and 29 of the respective end sections 21 and 22, thus joining the several sections in operative assembled relation with the bearing faces 24 and 28 and the bearing faces 26 and 30 in mutual contact or meeting engagement.

The joint structure further includes means for coupling the same to and between the standard 10 and the carrying arm or bracket 11 of the lamp support. As shown by way of illustration, such coupling means comprises a lower coupling element 33 having a screw-threaded portion 34 adapted for fixed attachment to the standard 10, and an upper like coupling element 35 having a screw-threaded portion 36 adapted for attachment to the carrying arm or bracket 11. Each said coupling element is provided with an axial through passage 37. The lower end section 21 of the joint structure is connected in swiveling relation to the lower coupling element 33, and, to this end, one of said parts, e. g. the coupling element 33, is provided at its upper end with an external annular flange 38 and the other part, e. g. the lower end section 21, is provided with an annular peripheral coupling bead 39 which is adapted to embrace said flange 38. The upper end section 22 of the joint structure is similarly connected in swiveling relation to the upper coupling element 35 as by means of an external annular flange 40 of said coupling element 35 which is embraced by an annular peripheral coupling bead 41 with which said upper end section 22 is provided.

Helical spring means is arranged to extend longitudinally from one coupling element to the other through the interior of the assembled sections 21, 20 and 22 of the joint structure. This spring means comprises a pair of helical spring bodies telescoped together one within the other; one said spring 42 being of right hand convolute pitch and the other spring 43 being of left hand convolute pitch. One end of spring 42 and a corresponding end of spring 43 are provided with respective anchor portions 44 and 45 which are imbedded in or otherwise suitably secured to the lower coupling element 33. Similarly, the opposite end of spring 42 and the corresponding end of spring 43 are provided with respective anchor portions 46 and 47 which are imbedded in or otherwise suitably secured to the upper coupling element 35. The said springs are calibrated so as to possess substantially the same tension under twisting torque, and being of opposite convolute pitch and disposed in concentric parallel relation, the same hold the coupling elements interconnected against substantial relative rotational displacement, whereby the end sections of the joint structure are caused to swivel on the coupling elements when the sections of the joint structure are relatively rotated to bend the joint structure as a whole. The springs 42 and 43 will readily flex longitudinally and will therefore easily yield and smoothly curve in general conformation to various angular dispositions to which the sections of the joint structure may be relatively moved to effect bending adjustment of the joint structure. By reason of this, the springs provide highly efficient protective or guard means through which the wire cord or cable 15 extends in its passage through the joint structure, and consequently function to prevent subjection of said wire cord or cable to injurious stresses or strains, abrasion, kinking or like deformation.

It will be obvious that selective relative rotation of the sections 20, 21, 22 of the joint structure will effect a desired shaping of the joint structure as a whole, whereby various dispositions of the supported lamp bulb 14 may be attained; for example, the sections may be axially aligned as shown in Fig. 1, or angularly related as shown in Figs. 4 and 5, or moved to various other selected relative positions as may be desired. Since the opposite coupling elements 33 and 35 are held against any substantial relative rotation by the interconnecting springs 42 and 43, the sections 21 and 22, when the joint structure is adjusted to a desired shape, will readily swivel upon said coupling elements 33 and 35 as well as upon the intermediate section 20, and when the sections are relatively adjusted the same will retain their adjusted relative positions until manually moved to other positions.

While I have described my invention in its preferred embodiment, it is to be understood that the words which I have used are words of description rather than of limitation and that changes within the purview of the here following claims may be made without departing from the true scope and spirit of my invention in its broader aspects.

What I claim is:

1. An adjustable joint structure comprising a plurality of endwise adjoined tubular sections, swiveling connections between opposed ends of said sections, said swiveling connections lying in angular planes transverse to the longitudinal axes of said sections, successive swiveling connections being inclined in opposite directions, coupling elements for connecting the joint structure between parts to be joined thereby, swiveling connections between the end sections of the joint structure and the respective coupling elements, and helical spring means extending through the joint sections from one coupling element to the other.

2. An adjustable joint structure comprising a plurality of endwise adjoined tubular sections, swiveling connections between the opposed ends of said sections, said swiveling connections lying in angular planes transverse to the longitudinal axes of said sections, successive swiveling connections being inclined in opposite directions, coupling elements for connecting the joint structure between parts to be joined thereby, swiveling connections between the end sections of the joint structure and the respective coupling elements, and helical spring means extending through the joint sections from one coupling element to the other, said spring means comprising a pair of spring members disposed in telescoped parallel relation, the convolutions of one said spring member being of right hand pitch, and the convolutions of the other spring member being of left hand pitch.

3. An adjustable joint structure comprising a plurality of endwise adjoined tubular sections, swiveling connections between opposed ends of said sections, said swiveling connections lying in forty-five degree angular planes transverse to the longitudinal axes of said sections, successive swiveling connections being inclined in opposite directions, tubular coupling elements for connecting the joint structure between parts to be joined thereby, swiveling connections between the end sections of the joint structure and the respective coupling elements and lying in transverse planes perpendicular to the axes thereof, and helical spring means extending through the joint sections from one coupling element to the other with opposite ends thereof affixed to the respective coupling elements.

4. An adjustable joint structure comprising a plurality of endwise adjoined tubular sections, swiveling connections between opposed ends of said sections, said swiveling connections lying in forty-five degree angular planes transverse to the longitudinal axes of said sections, successive swiveling connections being inclined in opposite directions, tubular coupling elements for connecting the joint structure between parts to be joined thereby, swiveling connections between the end sections of the joint structure and the respective coupling elements and lying in transverse planes perpendicular to the axes thereof, and helical spring means extending through the joint sections from one coupling element to the other with opposite ends thereof affixed to the respective coupling elements, said spring means comprising a pair of spring members disposed in telescoped parallel relation, the convolutions of one said spring member being of right hand pitch, and the convolutions of the other said spring member being of left hand pitch.

5. An adjustable joint structure comprising a plurality of endwise adjoined tubular sections, swiveling connections between opposed ends of said sections, said swiveling connections lying in angular planes transverse to the longitudinal axes of said sections, successive swiveling connections being inclined in opposite directions, each swiveling connection comprising opposed external flanges extending from opposed ends of adjoining sections and meeting in face to face relation, one of said flanges having a marginal coupling bead disposed to embrace the marginal periphery of the opposing flange, tubular coupling elements for connecting the joint structure between parts to be joined thereby, swiveling connections between the end sections of the joint structure and the respective coupling elements and lying in transverse planes perpendicular to the axes thereof, and helical spring means extending through the joint sections from one coupling element to the other with opposite ends thereof affixed to the respective coupling elements.

6. An adjustable joint structure comprising a plurality of endwise adjoined tubular sections, swiveling connections between opposed ends of said sections, said swiveling connections lying in angular planes transverse to the longitudinal axes of said sections, successive swiveling connections being inclined in opposite directions, each swiveling connection comprising opposed external flanges extending from opposed ends of adjoining sections and meeting in face to face relation, one of said flanges having a marginal coupling bead disposed to embrace the marginal periphery of the opposing flange, tubular coupling elements for connecting the joint structure between parts to be joined thereby, swiveling connections between the end sections of the joint structure and the respective coupling elements and lying in transverse planes perpendicular to the axes thereof, and helical spring means extending through the joint sections from one coupling element to the other with opposite ends thereof affixed to the respective coupling elements, said spring means comprising a pair of spring members disposed in telescoped parallel relation, the convolutions of one spring member being of right hand pitch, and the convolutions of the other spring member being of left hand pitch.

7. An adjustable joint structure for connecting relatively movable members of an electric lamp support, said joint structure comprising an intermediate tubular section and oppositely extending tubular end sections arranged in endwise adjoined relation, swiveling connections between opposed ends of said sections, said swiveling connections lying in forty-five degree angular planes transverse to the longitudinal axes of said sections, said swiveling connections being inclined in opposite directions, tubular coupling elements for respectively connecting the respective end sections in attached relation to the respective relatively movable members of the lamp support, swiveling connections between said end sections and said coupling elements, helical spring means extending through said sections from one coupling element to the other with opposite ends thereof affixed to the respective coupling elements, said spring means comprising a pair of spring members disposed in telescoped parallel relation, the convolutions of one said spring member being of right hand pitch and the convolutions of the other said spring member being of left hand pitch, and electrical conductor means extending through the coupling elements and axially through said spring means within the joint structure.

8. An adjustable joint structure for connecting relatively movable members of an electric lamp support as defined in claim 7, wherein said swiveling connections comprise opposed external flanges extending from opposed ends of adjoining sections and opposed ends of adjoined sections and coupling elements and meeting in face to face relation, one of said flanges having a marginal coupling bead disposed to embrace the marginal periphery of the opposing flange.

VICTOR LANG, JR.

No references cited.